United States Patent [19]

Mead

[11] 4,445,543
[45] May 1, 1984

[54] FLEXIBLE HOSE FOR LIQUEFIED GASES

[75] Inventor: Howard B. Mead, Tarporley, England

[73] Assignee: Shell Research Limited, London, England

[21] Appl. No.: 419,952

[22] Filed: Sep. 20, 1982

[30] Foreign Application Priority Data

Oct. 2, 1981 [GB] United Kingdom ............... 8129791

[51] Int. Cl.$^3$ ........................................... F16L 11/11
[52] U.S. Cl. ...................................... 138/122; 62/55
[58] Field of Search .................. 62/55; 138/121, 122, 138/126, 127, 128, 131, 134, 118.1; 174/15.5; 220/901; 128/DIG. 7

[56] References Cited

U.S. PATENT DOCUMENTS

| | | | |
|---|---|---|---|
| 2,176,762 | 10/1939 | Forbes | 138/131 X |
| 3,272,373 | 9/1966 | Alleaume et al. | 220/901 X |
| 3,300,571 | 1/1967 | Downey et al. | 138/131 X |
| 3,565,118 | 2/1971 | Stearns | 220/901 X |
| 3,795,245 | 3/1974 | Allen, Jr. et al. | 62/55 X |
| 3,956,544 | 5/1976 | Harrington | 138/128 X |
| 4,315,408 | 2/1982 | Karl | 62/55 |

FOREIGN PATENT DOCUMENTS

| | | | |
|---|---|---|---|
| 768006 | of 1971 | Belgium | 138/134 |
| 1312509 | of 1973 | United Kingdom | 138/122 |
| 1383313 | of 1975 | United Kingdom | 138/134 |

Primary Examiner—Stephen Marcus
Assistant Examiner—Mark Thronson
Attorney, Agent, or Firm—Pravel, Gambrell, Hewitt, Kirk & Kimball

[57] ABSTRACT

Flexible hose for liquefied gases, comprising a tubular body of biaxially oriented polypropylene film (2) arranged between an inner helically wound wire (3) and an outer helically wound wire (4), said wires being wound at the same pitch but having the windings displaced by half a pitch width from each other.

12 Claims, 1 Drawing Figure

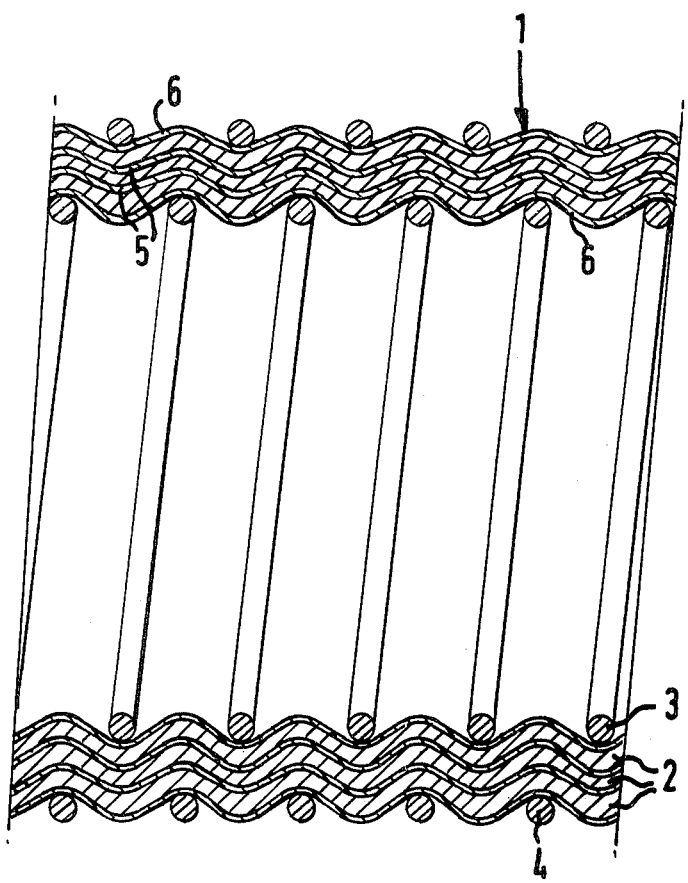

FLEXIBLE HOSE FOR LIQUEFIED GASES

The invention relates to a flexible hose for liquefied gases, such as liquefied natural gas or liquefied propane.

The invention relates more in particular to a flexible hose for liquefied gases comprising a tubular body of flexible material arranged between an inner helically wound wire and an outer helically wound wire, said wires being wound at the same pitch but having the windings displaced by half a pitch width from each other. The tubular body of flexible material has to fulfil two basic requirements, viz. the tubular body must maintain its flexibility and strength at cryogenic temperatures and must form a liquid and gas-tight sealing.

Known is a flexible hose of the above kind for liquefied gases wherein the tubular body of flexible material is formed by layers of polyethylene terephthalate film with or without layers of polyethylene terephthalate cloth, to meet the above two basic requirements.

When such hoses are used for example in loading and/or off-loading liquefied gas tankers, the hoses are subject to continuous flexure owing to the ship movement, and in a floating configuration of the hoses to wave motions. The fatigue resistance of the hoses to this flexure has a clear bearing on the down-time and replacement costs attributable to failed hoses.

The object of the present invention is to improve the above-mentioned known type of flexible hoses by providing a flexible hose for liquefied gases having an improved fatigue-resistance so that the lifetime of the hose is considerably prolonged relative to the lifetime of the known hoses for liquefied gases.

The flexible hose for liquefied gases according to the invention thereto comprises a tubular body of biaxially oriented polypropylene film arranged between an inner helically wound wire and an outer helically wound wire, said wires being wound at the same pitch but having the windings displaced by half a pitch width from each other.

It has been found that the application of biaxially oriented polypropylene film instead of polyethylene terephthalate film in hoses for liquefied gases improves the fatigue-resistance considerably without however affecting the above-mentioned basic requirements of the hoses. Biaxially oriented polypropylene film remains flexible at cryogenic temperatures and is impermeable to liquids and gases.

Tests have been carried out with a 250 mm bore hose according to the invention. When filled with liquid nitrogen having a boiling point of minus 196° C. and flexed in a vertical test tower, the hose according to the invention withstood about 10 times more cycles without failure than a 250 mm bore hose having a tubular body of polyethylene terephthalate film. In a suitable embodiment of the present invention the tubular body of biaxially oriented polypropylene film is combined with a coaxial tubular body of high strength material, such as polyethylene terephthalate cloth to improve the axial strength of the flexible hose.

The invention will now be described in more detail with reference to the drawing showing a longitudinal cross section of a flexible hose for liquefied gases according to the invention. Reference numeral 1 indicates a flexible hose for liquefied gases. The hose 1 comprises a plurality of coaxial tubular bodies 2 of biaxially oriented polypropylene film arranged between an inner helically wound wire 3 and an outer helically wound wire 4. The windings of the outer wire 4 are displaced by half a pitch width from the windings of the inner wire 3 so that the convolutions of the outer helically wound wire 4 lie within the grooves of the inner helically wound wire 3. These convolutions together with the flexible nature of the tubular bodies 2 of biaxially oriented polypropylene film give the hose 1 its required flexibility. Between each pair of adjacent tubular bodies 2 of biaxially oriented polypropylene film a tubular body 5 of flexible material is arranged which material has a high axial strength which improves the axial strength of the hose, and is resistant to cryogenic temperatures. An example of such a material is polyethylene terephthalate cloth. The application of such strength improving tubular bodies 5 in addition to the tubular bodies 2 of biaxially oriented polypropylene film makes the hose in particular suitable for high duty operations wherein the hose must withstand high axial stresses.

To avoid wear of the innermost and the outermost tubular bodies 2 due to friction of the inner wire 3 and the outer wire 4 respectively over said tubular bodies 2, a layer 6 of wear resistant material is arranged between the innermost tubular body 2 and the inner wire 3 as well as between the outermost tubular body 2 and the outer wire 4. A suitable wear-resistant material is for example polyethylene terephthalate cloth. In manufacture the above-mentioned components are built up in succession over a mandrel.

Each of the tubular bodies 2 of biaxially oriented polypropylene film may consist of a single tubular layer or a plurality of relatively thin tubular layers of biaxially oriented polypropylene film.

Each tubular layer may be formed by interconnecting opposite sides of a film of biaxially oriented polypropylene or by helically winding a film of biaxially oriented polypropylene around the already formed part of the hose.

Although the hose shown in the drawing comprises three coaxial tubular bodies 2 of biaxially oriented polypropylene film, it is also possible to apply another number of coaxial tubular bodies or a single tubular body of biaxially oriented polypropylene film. To obtain a sufficient flexibility at cryogenic temperatures the application of at least two coaxial tubular bodies of biaxially oriented polypropylene film is to be preferred. A plurality of tubular bodies of biaxially oriented polypropylene film moreover improves the resistance of the hose against deterioration compared with a single tubular body of biaxially oriented polypropylene film.

The present invention is not restricted to the combination of tubular bodies 2 of biaxially oriented polypropylene film and tubular bodies 5 of axial strength improving material as shown in the drawing. When the hose is intended for use in low pressure operations the tubular bodies of axial strength improving material can be deleted.

Instead of the application of the layers 6 the helically wound wires 3 and 4 may be provided with a friction reducing coating to avoid wear of the innermost and the outermost tubular body 2.

Finally it is noted that the hose according to the invention may be provided with a body of heat insulating material arranged around the outer helically wound wire. Said body of heat-insulating material may be enveloped by a gas and liquid-tight layer, so that a flexible floating heat-insulated hose is obtained.

I claim:

1. Flexible hose for liquified gases, with improved fatique-resistance, which remains flexible at cryogenic temperatures, and which is impermeable to liquids and gases, comprising a tubular body of biaxially oriented polypropylene film arranged between an inner helically wound wire and an outer helically wound wire, said wires being wound at the same pitch but having the windings displaced by half a pitch width from each other.

2. Flexible hose as claimed in claim 1, wherein the tubular body of biaxially oriented polypropylene film is formed by at least one tubular layer of biaxially oriented polypropylene film.

3. Flexible hose as claimed in claim 2, wherein each tubular layer of biaxially oriented polypropylene film is formed by interconnecting opposite sides of a film of biaxially oriented polypropylene.

4. Flexible hose as claimed in claim 2, wherein each tubular layer of biaxially oriented polypropylene film is formed by a helically wound film of biaxially oriented polypropylene.

5. Flexible hose as claimed in claim 1, wherein the tubular body comprises a plurality of tubular elements of biaxially oriented polypropylene film, and wherein adjacent tubular elements of biaxially oriented polypropylene film are separated from each other by a tubular body of high strength material to improve the axial strength of the hose.

6. Flexible hose as claimed in claim 5, wherein the high strength material consists of polyethylene terephthalate cloth.

7. Flexible hose for liquified gases, with improved fatigue-resistance, which remains flexible at cryogenic temperatures, and which is impermeable to liquids and gases, comprising a plurality of coaxial tubular bodies of biaxially oriented polypropylene film arranged between an inner helically wound wire and an outer helically wound wire, said wires being wound at the same pitch, but having the windings displaced by half a pitch width from each other, where said tubular bodies of biaxially oriented polypropylene film are adjacent to and separated from each other by a tubular body of high strength material to improve the axial strength of the hose;

two layers of wear-resistant material, one layer being arranged between the innermost tubular body of biaxially oriented polypropylene film and said inner helically wound wire, and the other layer being arranged between the outermost tubular body of biaxially oriented polypropylene film and said outer helically wound wire; and a layer of heat insulating material arranged around said outer helically wound wire.

8. Flexible hose as claimed in claim 7, wherein each tubular layer of biaxially oriented polypropylene film is formed by interconnecting opposite sides of a film of biaxially oriented polypropylene.

9. Flexible hose as claimed in claim 7, wherein each tubular layer of biaxially oriented polypropylene film is formed by a helically wound film of of biaxially oriented polypropylene.

10. Flexible hose as claimed in claim 7, wherein the high strength material consists of polyethylene terephthalate cloth.

11. Flexible hose as claimed in claim 7, wherein the wear-resistant material consists of polyethylene terephthalate cloth.

12. Flexible hose as claimed in claim 7, wherein the layer of heat insulating material is enveloped by a gas and liquid-tight layer.

* * * * *